United States Patent [19]
Ullmann et al.

[11] 3,973,104
[45] Aug. 3, 1976

[54] APPARATUS FOR REGULATING AN ELECTRIC DISCHARGE MACHINING GAP

[75] Inventors: Werner Ullmann, Locarno; Bernardo Ferroni, Ascona; Bernd Schumacher, Losone, all of Switzerland

[73] Assignee: A.G. fur industrielle Elektronik AGIE Losone b. Locarno, Losone, Switzerland

[22] Filed: July 29, 1974

[21] Appl. No.: 492,858

Related U.S. Application Data
[62] Division of Ser. No. 312,864, Dec. 7, 1972.

[30] Foreign Application Priority Data
Aug. 17, 1972 Switzerland.................. 12214/72

[52] U.S. Cl. .................. 219/69 G; 219/69 P; 235/151.11; 219/69 C
[51] Int. Cl.² .................................. B23P 1/08
[58] Field of Search ............. 219/69 G, 69 C, 69 M, 219/69 S, 69 P; 204/129.25; 235/151.1, 151.11

[56] References Cited
UNITED STATES PATENTS

| | | | |
|---|---|---|---|
| 3,558,844 | 1/1971 | Lobur | 219/69 G |
| 3,632,942 | 1/1972 | Kondo | 219/69 G |
| 3,739,137 | 6/1973 | Marendaz | 219/69 G |
| 3,775,578 | 11/1973 | Verner | 219/69 G |
| 3,793,502 | 2/1974 | Bell | 219/69 G |

FOREIGN PATENTS OR APPLICATIONS

20,205    11/1966    Japan.......................... 204/129.25

Primary Examiner—Bruce A. Reynolds
Attorney, Agent, or Firm—William R. Woodward

[57] ABSTRACT

The peak voltage of each discharge pulse is measured and, if the voltage of the pulse exceeds a high threshold value, there is also measured the time between the passing of that value and the moment the pulse voltage thereafter drops below a second lower threshold value. The two measurements are expressed in pulses that are combined, preferably by addition, to provide a regulating value, whose deviation ("error") from a standard value is predicted for a coming period, taking account of recent electrode position change as well as regulating value trend. The sign of the predicted error determines in which direction the electrode drive motor will be energized, but if the predicted error is less than a threshold value no motor energization occurs until the next error prediction. The sense in which the regulation operates is so defined that at a time when the electrodes are not already in relative movement an increase in the regulating value, at least if it persists, causes the electrodes to be moved closer together.

9 Claims, 8 Drawing Figures

| \|S\| - S₀ | SIGN OF S | ELECTRODE MOTION | MOTOR ACTION |
|---|---|---|---|
| 0 OR −<br>+ + + + + + | (IMMATERIAL)<br>+ + + − − − | (IMMATERIAL)<br>0  ↓↑  ↑↓  0  ↑↓  ↓↑ | 0  ↓↑ ↓↑ *  ↑↓ ↑↓ * |

APPARATUS FOR REGULATING AN ELECTRIC DISCHARGE MACHINING GAP

This is a division, of application Ser. No. 312,864, filed Dec. 7, 1972.

This invention concerns a method of regulating the working gap of electro-erosion machining equipment in which a workpiece electrode to be machined and a tool electrode are adjusted in relative position by an electrode advancing drive. In such equipment, voltage pulses of a predetermined duration repeated at suitable time intervals are applied to produce electric discharges of a particular desired type for machining by erosion of the workpiece. The gap is flushed with a suitable liquid to remove material loosened or separated. The invention also concerns apparatus for carrying out the regulating method.

In known electro-erosion machines of the kind just mentioned, the width of the working gap between the tool electrode and the workpiece electrode is regulated during the erosion operation by an automatic electrode advancing mechanism which may simply be referred to as the drive of the machine. In their operation, the average gap voltage, the average gap current or the gap resistance is taken as a regulating value (measured value) and compared with the desired value of the same parameter. The voltage difference produced by this comparison is supplied to an electrode drive for regulating the width of the working gap. Such regulation methods have the great disadvantage of either not recognizing at all any deformation of the form or condition of the pulses crossing the working gap or else not recognizing such deformation soon enough. In consequence, the electrode drive is not controlled in correspondence with the physical conditions in the working gap, with the further result that the erosion operations are both frequently interrupted and that the efficiency of the operation is poor. There is also the further disadvantage that the energy liberated by individual working pulses in the gap modifies the regulation characteristics of the known electrode drive controls. Further modifications of regulation characteristics can arise if the operator readjusts the electrical parameters of the erosion voltage generator, such as voltage, current, duty cycle, or repetition frequency, or if during the erosion operation the physical conditions in the working gap change unfavorably in an uncontrolled manner as a result of changes in the flow or condition of the liquid flushing medium or changes in the effective carrier between tool and workpiece. In both cases the operator must carry out time consuming efforts to make readjustments for maintenance of the regulating system of the electrode drive. These regulating systems, as is well known, must be adjusted to fit modified erosion process conditions.

The object of the invention is to avoid the disadvantages above mentioned of the known regulating systems for electrode drives and, moreover, to make possible the timely determination of deformation in the form and nature of pulses in the various ways they arise in electrode erosion machining technology and finally to provide regulation commands to the electrode drive at a sufficiently early time. By timely determination is to be understood that as soon as a tendency to deformation of a pulse form or shape or a tendency to deterioration of the pulse is found, and before the deformation or deterioration has actually taken place, the appropriate regulating value will be entered into the control system of the electrode drive. The course of pulse deformation or deterioration as observed has been found to indicate an incipient degeneration of the erosion discharge.

Subject matter of the present invention

Briefly, for every pulse applied at the working gap, the peak voltage is measured and also the time between the moment the pulse voltage first rises past a particular voltage value related to the rising edge of the pulse and the moment the pulse voltage thereafter drops below a second voltage value related to a falling edge of the pulse. The width of the working gap of the electrode erosion machine is then regulated in a manner dependent upon those values, that is, the peak voltage and the time measurement of the invention. With the proper choice of units for measurement of voltage and time it is convenient to provide a regulating value by simple addition of the two measurements, with the time measurement blanked out, however, unless the peak voltage reaches at least a certain threshold. It is also useful to apply the regulating value for control purposes, after averaging procedures, by the calculation of a predicted regulating value, or predicted deviation of the regulating value from a reference value thereof, which in either case, takes account of current electrode motion. For this purpose the change of regulating value and of electrode position from one measurement or average measurement to the next is continually computed. The sense in which the regulation operates is so defined that at a time when the electrodes are not already in relative movement an increase in the regulating value, at least if it persists, causes the electrodes to be moved closer together.

The arrangement of apparatus carrying out the method of the invention has the following features. A multi-level detector is used as a voltage responsive element with its input connected to the two electrodes facing the working gap. The rising edge of the voltage pulse exceeds successive predetermined threshold values of the multi-level detector and the succession of signals so produced are supplied to a storage register. In addition, when a particular first threshold value related to the rise characteristic of the voltage pulse, which may be referred to as the first threshold value, is exceeded, the corresponding response of the multilevel detector operates a gate circuit starting a counter, which is stopped when the falling edge of the voltage pulse goes below a second threshold value producing a corresponding signal, so that the counter measures the time period between the first and second threshold values of the voltage pulse as just mentioned. The storage register is then connected with the counter over an interlocking circuit which provides for transferring the content of the storage register to the counter only when the trailing edge of the pulse has dropped below the aforesaid second threshold value. When that transfer occurs, the transferred information is combined with the aforesaid time measurement in the counter. At the end of the pulse in the working gap a logic control system transfers the combined content of the counter over to a regulating circuit to serve as a regulating value on the basis of which the electrode drive is controlled by the regulating circuit. The regulating circuit has a circuit for computing the average regulating value for successive groups of a predetermined number of pulses, the difference between each such average value and a preset reference value of the regulating value, the difference between each such average value and the preceding average value and the displacement of the movable electrode between the times represented by the last average value and the preceding average value of the regulating value. These computations are combined in the regulating circuit to provide a predicted deviation of the regulating value from the reference value, the sign (or sense) of which determines in which direction the motor will be driven unless the magnitude of the predicted deviation is zero or very near zero. When the pause between the pulses in the working gap begins, the logic control circuit resets to zero both the storage register and the counter.

The invention is further described by way of example with reference to the annexed drawings, wherein.

Figure 1A:
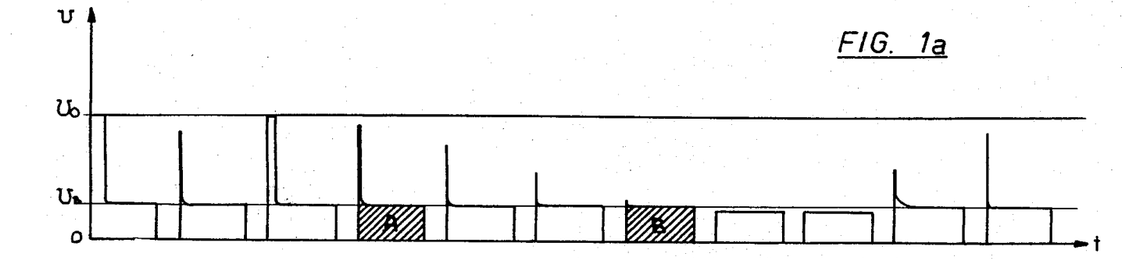
FIGS. 1a and 1b are graphical representations showing the deformation of square voltage pulses in the case of greater and smaller discharge energy respectively.

In FIG. 1a are shown various forms and types of pulses. The voltage U is plotted as the ordinate and time as the abscissa in this graphical representation. The first of the pulses shown has a peak voltage corresponding to the voltage $U_0$ and is of normal shape and form. For a pulse of this type, a certain delay period passes between the beginning of the ignition voltage and the discharge which occurs when the voltage U of the pulse drops to the normal firing voltage $U_b$.

The second pulse shows that as the result of changes in the physical conditions in the working gap, the discharge already strikes at a much smaller ignition voltage than was the case with the first pulse. In the case of the third pulse shown, the physical condition of the working gap has changed back in the direction of normalization, so that this pulse provides a discharge only after the ignition voltage $U_o$ is reached and with a delay between the beginning of the ignition voltage and the discharge at the firing voltage $U_B$, which is smaller than in the case of the first pulse. These pulses are shown to indicate the changes in shape or form of the pulses reaching the working gap that occur without the known gap regulating systems or their operators being able to notice anything of these changes. The fourth pulse, which is designated A, shows a discharge between the electrodes occurring at an ignition voltage somewhat smaller than the ignition voltage value $U_o$ for which the equipment is adjusted. From the succeeding pulses, it is easy to see the tendency, that an arc is rapidly forming. The occurrrence of this arc is shown at B. The characteristic of this arc is a firing voltage still smaller than in the case of normal pulse forms.

The tendency to deterioration or deformation of the pulse form in the direction of arc formation, shown in FIG. 1a and just discussed, has been up to now impossible to detect with any regulating system or by any operator. Only when the arc has formed in the working gap between the two electrodes does the first reaction of the known regulating systems take place. This is brought out by the situation indicated in FIG. 1a where the deformation of the form and shape of the pulse disappears a few pulses later and the pulses resume their normal shape and form. At this point it should be noted that the number of pulses shown in FIG. 1a in the transition from one form to another does not correspond with reality. In practice, obviously, a greater number of pulses are applied at the working gap in going from one shape over to another. Finally, it should also be remarked that the pulses shown in FIG. 1a are work pulses with relatively greater discharge energy, such as are used for coarse machining in electric erosion technology.

Figure 1B:
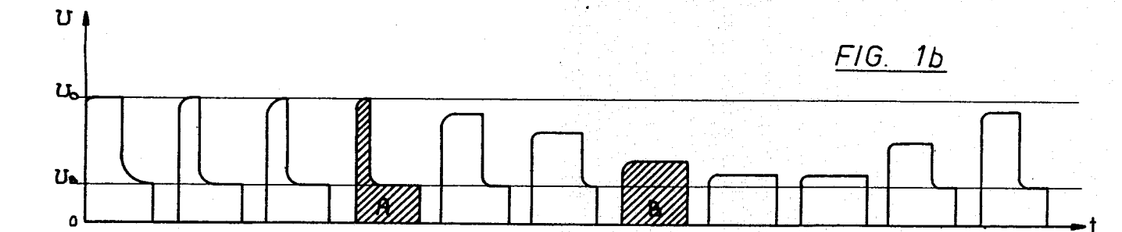

In FIG. 1b pulses of various forms and shapes are shown that involve small discharge energy and are used for fine or superfine machining. Again the voltage U is plotted as the ordinate and time as the abscissa. The first pulse reaches the ignition voltage $U_0$ and after a certain delay period the discharge takes place between the electrodes, so that the voltage of the pulse drops to its normal firing voltage $U_b$. In the case of fine or superfine machining the working gap is set much smaller than in the case of the pulse shown in FIG. 1 for coarse machining. If now in the case of fine or superfine machining with pulses as in FIG. 1b the working gap for some reason or circumstances is reduced still further, what happens to the form or shape of the pulses is shown by the succeeding pulses of FIG. 1b. From the second, third and fourth pulses (the fourth pulse has an area designated A) the tendency can be seen for the delay period which lies between the onset of the ignition voltage $U_o$ and the discharge, to become smaller while the ignition voltage does not change. The delay period shrinks only to a particular value, which, for example, is represented by the upper edge of the pulse A. If the working gap, already small, is still further reduced during fine or superfine machining, the phenomenon is produced that the ignition voltage of the pulse suddenly drops and the previously established delay period increases similarly. This is particularly apparent at the fifth pulse from the left. The tendency to deterioration or deformation in shape or form of the pulse, which is already present in the second pulse shown, leads to a condition represented by the pulse form and shape B. In such a condition the erosion operation has already stopped. The working gap in this case has effect only as a low ohm value resistance.

The known regulation systems cannot detect the tendency to deterioration and to deformation of these pulses. Only when the condition "B" is reached in the working gap and erosion has already stopped do the known regulation systems, after a certain regulation time, begin to affect the drive in such a way that the two electrodes are moved apart. Only then can the pulses be restored as shown in FIG. 1b to the right of condition B. In reality substantially more pulses than shown in FIG. 1b reach the working gap in going from one condition to the other. It may thus be noted that the known regulating systems for controlling the drive of electric erosion machines do not recognize deterioration or deformation of pulse form or shape in coarse machining, fine machining or superfine machining. Hence, the known regulating systems operate equally badly for the various kinds of electric erosion machining. In addition, special arrangements must be provided which relate only to the formation of arcs in the case of coarse machining or else react only to conductivity measurements, relating to the low ohm resistance condition in the working gap that may arise in fine or superfine machining. With these additional equipments the physical extent of such regulating systems becomes immense. In spite of these overgrown regulating systems, the tendency to pulse deterioration or deformation cannot be detected. As already mentioned, the complicated known regulating systems detect only the arcing condition in the case of coarse machining or the low ohmic resistance condition in the case of fine or superfine machining.

Figure 2:
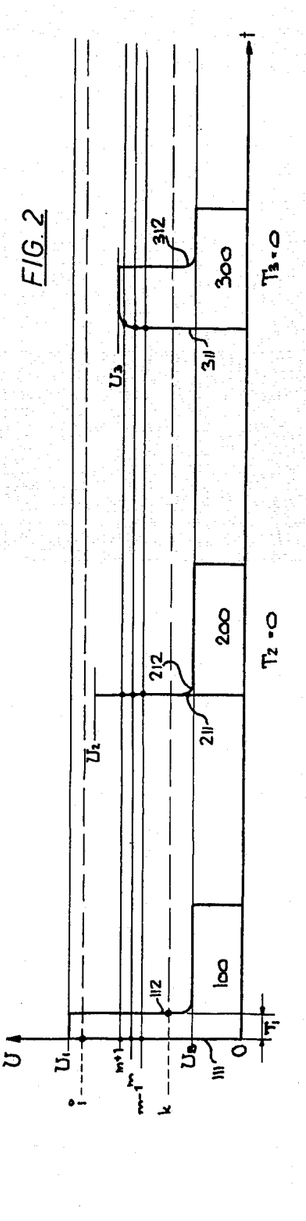
FIG. 2 is a graphical representation showing various pulse shapes for explanation of the method of the invention.

FIG. 2 shows the principle of the invention by which the deterioration tendency or deformation tendency or the pulses can be recognized both in coarse and also in fine and superfine machining. For comprehensive presentation, three pulses are shown in FIG. 2. Again the voltage U is plotted as ordinate and the time as abscissa. The pulse 100 represents a normal pulse. Its rising edge 111 rises up to the peak voltage $U_1$. The time $T_1$ begins with the steep rising edge and ends where the discharge of pulse 100 takes place. The falling or trailing edge of the pulse 112 is a portion of the discharge at the normal firing voltage $U_B$. The trailing contour 112 shows the composite portion of the pulse consisting of its discharge duration, firing duration and ending.

Figure 3:
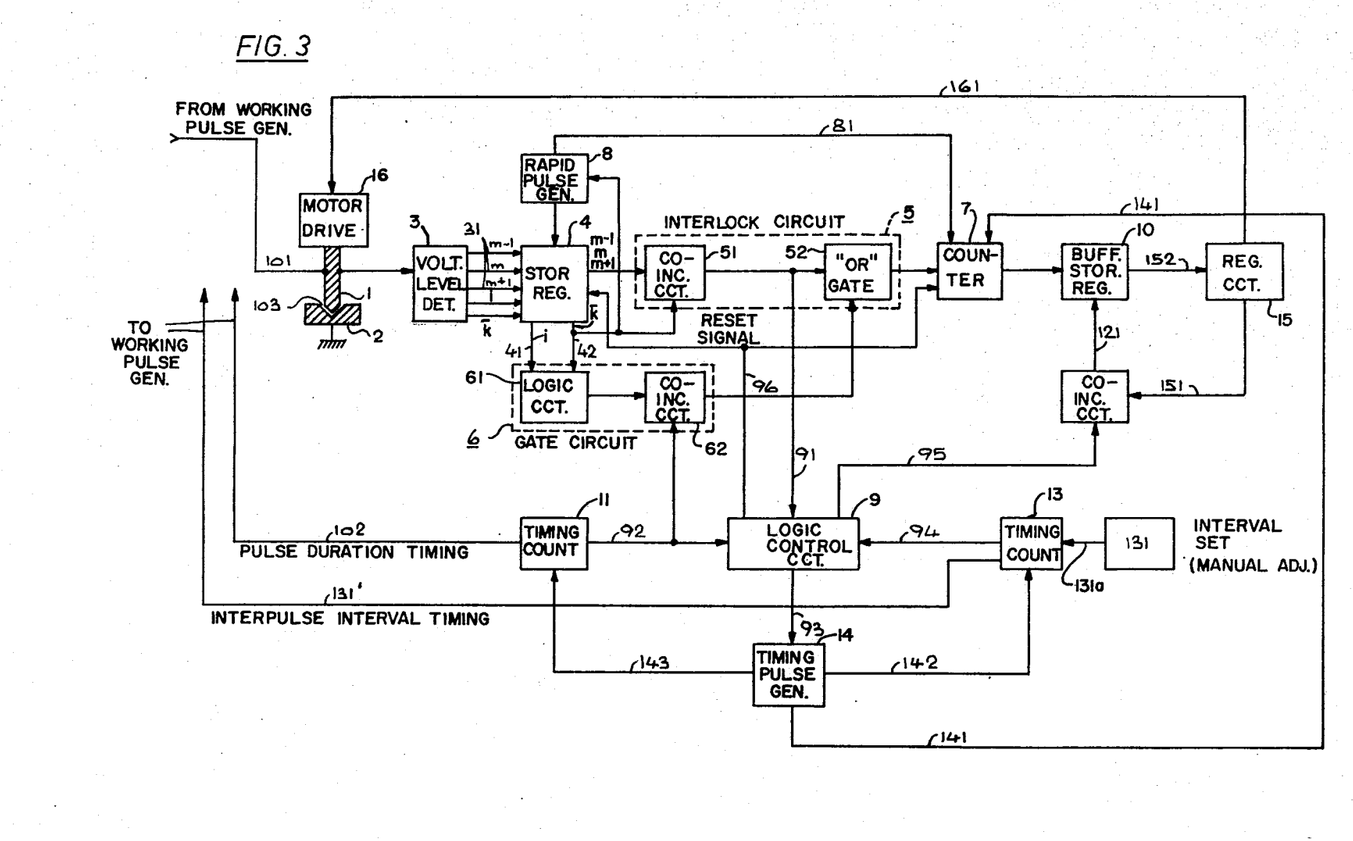
FIG. 3 is a simplified block diagram of the apparatus of the invention.

In accordance with the method of the invention, the peak voltage $U_1$ of the pulse 100 is detected in the apparatus of FIG. 3 and in addition, the time $T_1$ is measured, the latter being the period that elapses between a first threshold value i of the rising edge 111 and a second threshold value k of the falling edge 112. In the case of the rectangular pulse 100 of FIG. 2, the period $T_1$ lying between the threshold values i and k, by coincidence, is substantially the period of presence of the peak voltage $U_1$. In the case of other pulse forms, as for example trapezoidal, triangular or sinusoidal pulses, the period $T_1$ signifies only the lapse of time from the moment the threshold value i is exceeded to the moment when the pulse voltage falls below the threshold value k.

The pulse form 200 shown in FIG. 2 indicates the tendency to deterioration or deformation in the case of coarse machining, as has been explained in detail in connection with FIG. 1a. With the method of this invention, such a deterioration tendency is immediately ascertained. In the case of pulse 200, the rising edge 211 and a portion of the descending edge 212 come together in time because this pulse bridges the working gap at a low ignition voltage $U_2$. The measure period $T_2$ is in this case equal to zero. As will later be further developed, the regulating system of the invention immediately provides the corresponding control signal to the electrode drive, so that normal conditions again will be established in the working gap.

Pulse 300 in FIG. 2 shows the tendency to deterioration or deformation of the pulse form in the case of fine or superfine machining as already described in some detail in connection with FIG. 1b. In such a case, just as before in the case of coarse machining, the peak voltage $U_3$ is measured. The time that elapses between the threshold values i and k, designated in this case by $T_3$, is equal to zero. This results from the circumstance that the first threshold value i is no longer to be found on the rising edge 311 of the pulse. The second threshold value k indeed appears on the portion 312 of the descending edge of the pulse, but it alone has no effect on the apparatus for regulating the electrode drive further described in FIG. 3. In summary for FIG. 2, it should further be noted that the first threshold value i is important for the sensitivity of the regulating system. If the threshold value i for rectangular pulses 100, as shown in FIG. 2, is positioned on the rising edge 111 as shown in the drawing, the result is a greater sensitivity of the regulating system with respect to the tendency to deterioration or deformation under the different kinds of operation such as coarse machining (FIG. 1a) in fine or superfine machining (FIG. 1b).

The whole regulating system shown in block diagram in FIG. 3 will now be discussed in its particularities. A voltage level detector 3 is connected to the electrodes 1 and 2 between which is located the working gap 103. A single pole representation of all the connections has been chosen for the block diagram of FIG. 3. Thus only the connection between the single electrode 1 and the level detector 3 is drawn. If now the electronic output power switch (not shown in the drawing) of a pulse generator applies pulses to the two electrodes 1 and 2 over the conductor line 101, pulse forms as, for example, they are shown in FIGS. 1a, b and 2 appear at the work gap 103. Let it be assumed that the electrodes 1 and 2 are so positioned with respect to each other that the work gap 103 has a correct width. In this case, the pulse 100 of FIG. 2 appears at the working gap 103. The rising edge 111 of the pulse 100 is gauged in level detector 3 by means of M threshold values m. The level detector 3 contains a certain member of detector circuits for detecting the respective threshold values, thus providing a scanning operation. In FIG. 2 only three threshold values $m-1$, m and $M+1$ are shown for reasons of clarity. Of course, the level detector 3 can have as many detector circuits as are necessary to correspond to the desired subdivision of the rising edge 111 for measuring purposes. Hence, level detector 3 is equipped with M detector circuits and may appropriately be referred to as a multi-level detector.

As each threshold level is exceeded, the level detector 3 provides a definite signal to the storage register 4 over the connecting conductors, which are provided in appropriate number, namely M of them. These signals, which correspond to tqe indr5rm4al thre2hold values, are temporarily stored in storage register 4.

As soon as the threshold value i, defined as in FIG. 2 and related to the rising pulse edge 111, is overstepped, the level detector 3 provides the corresponding signal likewise to the storage register 4, which in this case provides a signal over connection 41 to the logic 61 of gate circuit 6 and switches the counter circuit 7 to the timing pulse generator 14 over connection 141 by means of OR-gate 52 of the interlock circuit 5 activated over the coincidence circuit 62 of the gate circuit logic, The counter 7 now fills with pulses from the timing pulse generator until the next selected threshold value k is detected by level detector 3. This threshold value is related to the upper part of the descending edge 112 of pulse 100, in accordance with FIG. 2. When the pulse voltage thus drops below the threshold value k, level detector 3 provides a corresponding signal to storage register 4, which in a similar way as already described above, switches counter circuit 7 off from timing pulse generator 14, acting over connection 42, gate circuit 6 and interlock circuit 5. At the same time, by action over other branches of connection 42 shown in FIG. 3, coincidence circuit 51 of the interlock circuit 5 is enabled and the rapid pulse generator 8 is caused to generate a train of output pulses that are furnished on the one hand to the storage register 4 and, on the other hand, to the counter 7 in order to effect the next operation. The content of storage register 4, which has stored in binary fashion the M items of threshold value m information, is thus transferred to the counter 7 over the interlock circuit 5, which is composed of the coincidence circuit 51 and the aforesaid OR-gate 52. When this happens, this transferred content is added to the stored time indication which was counted between the threshold values i and k. At this stage, there is accordingly in counter 7 the regulating magnitude which is the combination of the time and the total number M of detected threshold values.

During the transfer of the contents of storage register 4 to the counter 7, there also occurs the enabling of activation of the logic control circuit 9 over connection 91. Logic control circuit 9 does not become active, however, until the pulse 100 in working gap 103 has ended. This is assured over the connecting conductor 102 between the power pulsing circuit of the pulse generator (not shown) and the timing counter 11. The pulse end signal is provided over connection 92 to the logic control circuit 9. The latter, acting over connection 93, causes the timing pulse generator 14 to be disconnected from the timing counter 11 and to be connected over connection 142 to the second timing counter 13 for timing the interpulse interval. Timing counter 13 is provided with a manual adjustment 131 to set the duration of the pause between pulses, so that when that duration has been reached by counting timing pulses, it provides over connection 131a a signal to the pulse generator output power circuit (not shown) which commands the beginning of a new pulse furnished over connection 101. In this cjsn, tqe logrc control crrc4rt 9 also, over connection 93, disconnects the timing pulse generator 14 from the second timing counter 13 and reconnects it over connection 141 to the timing counter 11 to control the pulse duration. Since the timing pulse generator 14 is responsible for both the pulse duration and the duration of the interpulse interval for the working pulses at the working gap 103 and, at the same time, counts the time between the threshold values i and k of the pulses 100, a forced synchronization of all the values is provided, thus simplifying the circuit as a whole. For the following explanation, let it be assumed that the logic control circuit 9 is in the condition that holds when the pulse 100 in the working gap 103 has ended and timing pulse generator 14 has been connected over line 142 to the second timing counter 13 for timing the interpulse interval. In this condition, the logic control circuit 9 provides an output signal over connection 95 to the coincidence circuit 12. This output signal, provided over connection 121 to the intermediate or buffer storage register 10, serves to cause the combined content of counter circuit 7, which represents the regulating value, to be transferred to and stored in intermediate storage register 10. At this point, the logic control circuit 9 provides a reset signal over connection 96 to storage register 4 and counter circuit 7. The regulating circuit 15 can now obtain the regulating value signal temporarily stored in intermediate storage register 10, which it does in order to operate on this regulating value in the manner described below in connection with FIG. 4. From this regulating circuit are provided corresponding signals over connection 161 to the regulating drive 16 which can be a positioning motor for the tool electrode 1, for instance.

Up to now, it has been described what happens when a normal pulse 100 (see FIG. 2) is applied to working gap 103 and the various values which go into the formation of the observed regulating value for the pulse has been pointed out. In the next example, it will be explained how the regulating system operates when a pulse incorporating a tendency to deterioration or deformation of its shape or form is produced at the working gap 103. The pulses 200 and 300 of FIG. 2 are prototypes of such pulses.

The operation of the regulation system shown in FIGS. 3 and 4 will first be explained with reference to the pulse 200 of FIG. 2. There, with this consequence of uncontrollable changes of the physical conditions in the working gap 103, as for example new flushing liquid flow relations as the result of changed surface area of the electrodes 1 and 2 or undesired collection of erosion products or formation of gas bubbles within the dielectric medium, etc., the working pulses provided over connection 101 to the electrode gap, from equipment not shown, have a tendency to deterioration or deformation of their shape or form as shown in FIG. 1a for the case of coarse machining, now exemplified by the prototype pulse 200 of FIG. 2. In this case the level detector 3, as already described, scans the rising edge 211 of the pulse 200 and provides a signal over the connections 31 to the storage register 4 for each threshold value $m$. The rising edge 211 of pulse 200 is marked in FIG. 2 with the threshold values $m-1$ and $m+1$. Of course, the rising edge 211 is subdivided by considerably more threshold values. There are this larger number M of threshold values $m$. As previously mentioned, this number is determined by the number of threshold value circuits built into multilevel detector 3. The closer together the individual threshold values are, the more accurate is the scanning of the rising pulse edge 211 and especially the determination of the peak voltage $U_2$. Let it now be assumed for the example of pulse 200 that the peak voltage $U_2$ lies just above the threshold value $m+1$. The next higher threshold value $m+2$ will not be detected by the corresponding threshold circuit in level detector 3. Hence the storage position which is allocated to threshold value $m+1$ in storage register 4 is also the last filled position, a circumstance that provides the information indicating the peak value $U_2$. Since in the example provided by pulse 200 the peak voltage $U_2$ lies below the threshold value $i$, the storage position in register 4 allocated to this threshold value $i$ does not become occupied, so that the activation of gate circuit 6 over connection 41 to start counter 7 does not take place. In other words that means that in the case of the pulse 200 there is no counting of the time between the two threshold values $i$ and $k$. When now the threshold value k is passed on the descending edge 212 of the pulse, the coincidence circuit 51 of the interlocking circuit 5 will be opened over connection 32, so that the content of storage register 4 will be given to the counter 7 over the interlocking circuit 5. The threshold values m of the rising pulse edge 211 are now stored in counter 7. As already mentioned above, after this transfer of the content of storage register 4 to the counter 7, the logic control circuit 9 is put into condition to operate by means of connection 91 but actually begins operation only when the content of timing counter 11, which is responsible for fixing the duration of the working pulse at the working gap 103, announces the end of the pulse over the connection 92 to the logic control circuit 9. As already said, the timing counter 11 with the assistance of timing pulse generator 14, which is connected to it over connection 143, determines the duration of the working pulse in the working gap 103.

When the logic control circuit 9 has received the pulse end signal just described, it activates coincidence circuit 12 over connection 95, so that the content of counter circuit becomes temporarily stored in intermediate storage register 10. This content will be provided to the regulating circuit 15 over the connection 152, as soon as the regulating circuit has provided to the coincidence circuit over connection 151 the information that it needs the new regulating value for prediction of the regulating value deviation. The prediction of the next regulating value deviation is furnished over connection 161 to electrode drive motors 16, which in accordance with the signal either shifts the electrodes in one or the other direction or brakes their movement. That operation is described at a later point below in connection with FIG. 4. At this point, the operation of the system as shown in FIG. 3 is still under description.

Once the content of the counter 7 is stored in intermediate register 10, the logic control circuit 9 directs over connection 96 the resetting of storage register 4 and counter 7 to zero. Register 4 and counter 7 are thus made ready for the next pulse in the working gap 103. With register 4 and counter 7 set to zero, logic control circuit 9, acting over the connection 93, switches the timing pulse generator 14 away from timing counter 11, which is responsible for the duration of the working pulse, over to the second timing counter 13, which is responsible for the interpulse interval. This is indicated by the connections 142 and 143. The timing counter 13, which is set by manual control 131 to a particular pause length, provides a command over connecton 131' to the output pulsing circuit of the pulse generator (not shown) for turning the latter on at the end of the pause so that the next pulse can appear at the working gap 103. The timing counter 11 then controls the duration of this pulse over the connection 102. As already said, the timing pulse generator 14 is connected over line 143 with this timing counter 11.

Up to now, the determination of the observed regulating value for the pulses 100 and 200 shown in FIG. 2 as examples has been explained. It was assumed that pulse 100 is a so-called normal pulse which has no tendency to deterioration or deformation of its shape or form. The pulse 200 is taken as an individual pulse from the pulse sequence shown in FIG. 1a in order to show how the observed regulating value is formed for such a deformation-prone pulse. As already mentioned, a deterioration tendency is here involved which arises in coarse machining erosion, which tendency leads to the formation of an arc if countermeasures are not taken soon enough. The formation of the observed regulating value for the pulse 300 will now be briefly discussed as a third example.

This pulse 300 is taken from the pulse sequence of FIG. 1b and shows the tendency to deterioration of pulse form or shape in the case of fine or superfine machining. In these types of machining, the tendency toward deterioration or deformation of the pulse is provided by the following conditions:
by uncontrolled changes in the flow relations on the dielectric medium, or
by excessively high electric field strength resulting from the formation of graphite layers on the surfaces of electrodes 1 and 2 in the course of fine or superfine machining.

This cause is generally known. The pulse 300 shows a tendency particularly clearly. With the reduction of gap width, the peak voltage $U_O$ (FIG. 1b) sinks to the value $U_3$ (FIG. 2). Furthermore the period between the rising edge 311 and the upper part of the descending edge 312 increases. In the case of pulse 300, a discharge still does occur. This pulse shows a tendency, however, for discharges to be no longer possible and for the erosion operation to stop, as is shown for example by the pulse B of FIG. 1b.

The rising edge 311 of pulse 300 is as before subdivided into threshold values m which have already been described in detail in connection with other pulses. In the system of FIG. 3, these threshold values corresponding to the rising edge of the pulse will be stored in storage register 4. A count of the time period between a threshold value $i$ and a threshold value $k$ does not occur in this case, because the threshold value $i$ is not reached by the pulse 300. It is of course conceiveable, however, that the threshold value $i$ could be set low enough in level detector 3 that the pulse rise edge 311 would overstep that value.

The formation of the observed regulating value of the pulse 300 of FIG. 2 takes place in the same way as already described for the system of FIG. 3 in connection with the pulses 100 and 200. For completeness, it should be added that the regulating value of pulse 300 of FIG. 2 is stored in buffer storage register 10 of FIG. 3 from which register this regulating value is provided to the regulating circuit 15 as soon as the request therefore is given to the coincidence circuit 121 over the connection 151.

Figure 4:
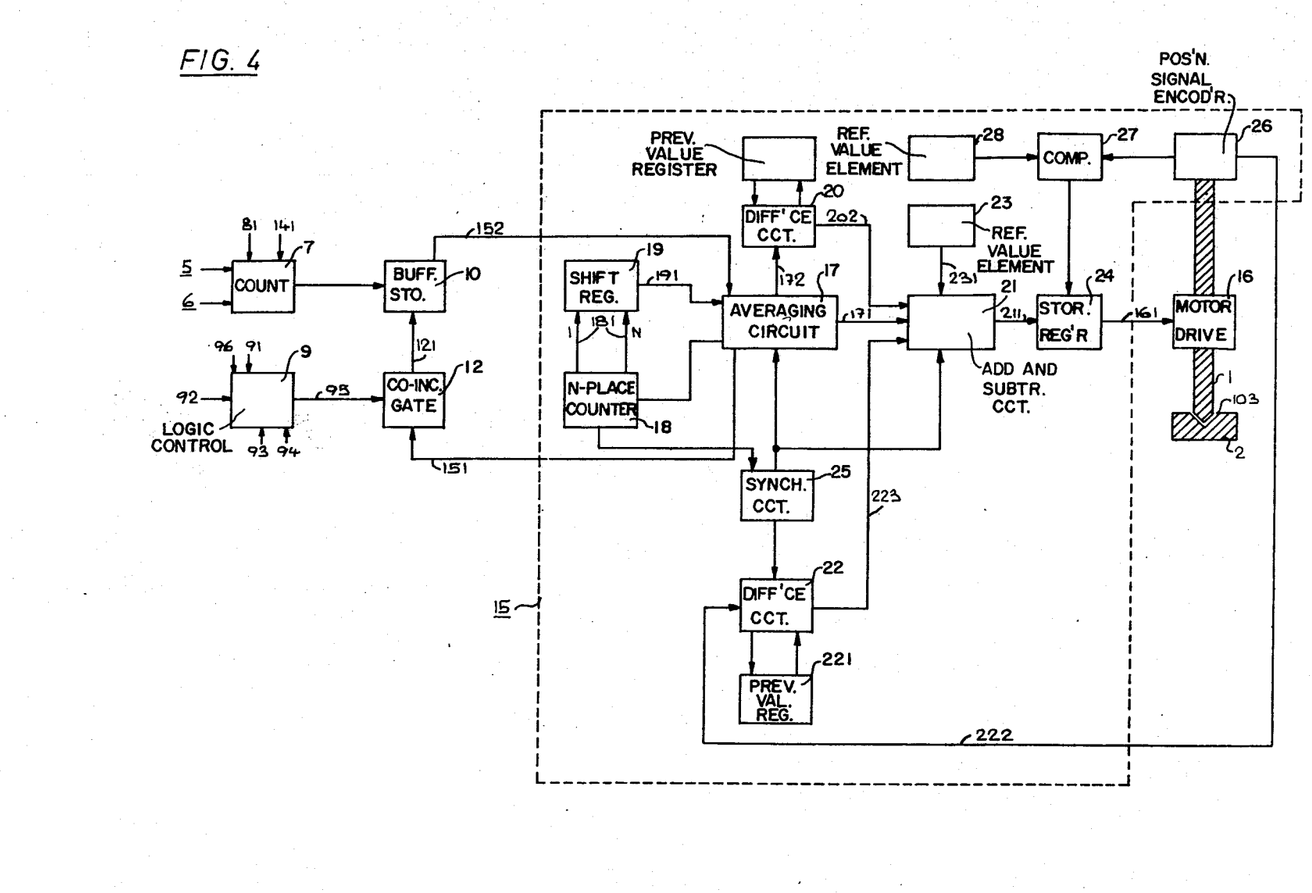
FIG. 4 is a detailed block diagram of a circuit arrangement forming part of the apparatus shown in FIG. 3.
Figure 5:
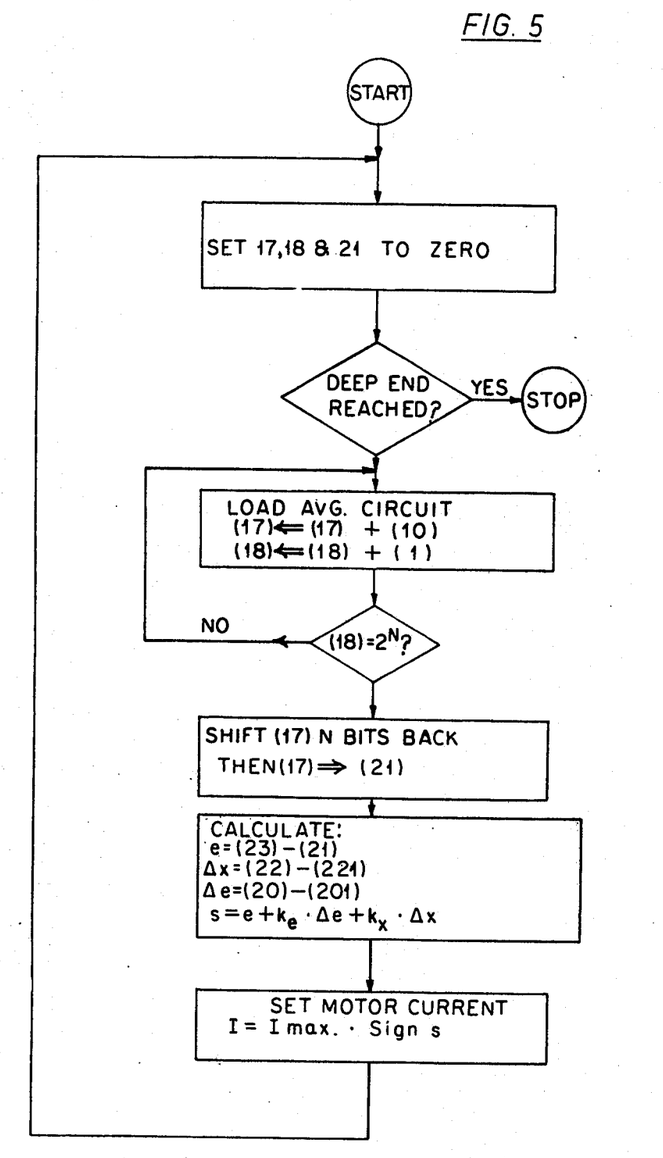
FIG. 5 is a flow chart of the operation of the circuit arrangement shown in FIG. 4.

It is now in order to describe further the regulation circuit 15 itself with reference to FIGS. 4 and 5.

When a series of normal pulses 100 appears in sequence at the working gap 103 of FIG. 3, no regulation action worthy of the name takes place in the regulating circuit 15 of FIG. 3 and FIG. 4, so that it is not necessary to consider the example of a normal pulse series for the discussion of FIGS. 4 and 5. It needs at most to be said that in the case of normal pulses 100, the working gap 103 remains fixed in its prescribed width in spite of the progressive erosion.

It is next assumed that the working gap 103 has a width suited for coarse machining and that after a certain time the normal pulse 100 becomes subject to a tendency to deterioration or deformation of the pulse in the gap 103. Such a tendency is shown in FIG. 1a and a prototype is shown in FIG. 2 as pulse 200. The response to this pulse has already been described with reference to FIGS. 2 and 3. The explanation given below proceeds from the point at which the regulating value is temporarily stored in buffer storage register 10 (FIGS. 3 and 4).

The averaging circuit 17 obtains the information concerning the regulating value for pulse 200 out of the intermediate storage register 10. This operation of obtaining the regulating value occurs over connections 151 and 121, just as several times described already. The regulating values of a number of pulses of the sequence represented by FIG. 1a is furnished over connection 152 to the averaging circuit 17. Thus, the regulating values of, for example, four pulses following in direct time sequence are added to each other so that from these values their average value is formed. As is further described below, the tendency to arc formation (FIG. 1a) is determined from this average value and accordingly utilized for regulation. The counting circuit 18 associated with averaging circuit 17 determines the number of pulses whose regulating values are to be added to each other. At every transfer of the regulating value of a pulse out of buffer storage register 10, the counter 18 changes its content by one. When the counter 18 has reached the value set in it, this N-place counter 18 provides a signal over connection 181 to an N-place shift register 19. The shift register 19 provides, over connection 191, a signal to the averaging circuit 17 to terminate the addition of the regulating values and to shift the content of averaging circuit 17 by N storage places. By this shift, the average value is formed from the regulating values of, for example, four successive pulses of FIG. 1a. The average value so produced is furnished over connection 171 to one of the inputs of addition and subtraction circuit 21. At this point, the addition and subtraction circuit 21 determines the difference between the average observed value and the desired or reference value which the setting of reference value element 23 forms and supplies over conductor 231.

The average value formed in circuit 17 is also furnished over connection 172 to the difference circuit 20 which forms the difference between the average value just formed and the average value formed from the five previous pulses, which previous average value is stored in register 201. It is assumed in this description that such a previous average value was formed and is stored in register 201, so that the difference circuit 21 can form the difference between the previous average value and the average now just reaching the difference circuit over connection 172. This difference between the two average values adjacent in time sequence is then supplied to the second of the three inputs of addition and subtraction circuit 21. Still another magnitude is also supplied to the third input of this circuit 21 as will now be further explained. This third value relates to the relative position of the electrodes and is, for example, formed from the position of electrode 1 which is formed to serve as a tool in the machining operation. Each time that an average value is formed in the circuit 17 and thereafter furnished over the connections 171 and 172 to the corresponding associated circuits, the spatial position of electrode 1 is indicated over connection 222 in a second difference circuit 22 and there compared with the spatial position which the electrode had at the time of the next preceeding average value signal of the regulating value, which was and is stored in register 221. It can thus be said in summary that every formation of an average value is associated with the determination of the difference of two successive average values and of the difference of two successive electrode position values. The difference between the two successive position values goes over connection 223 to the third input of addition and subtraction circuit 21. The synchronization circuit 25 assures that the above described events take place in proper synchronism. Only when these three inputs of the circuit 21 are occupied does the derivation of a predicted regulating value take place in addition and subtraction circuit 21. What is actually predicted is not the regulating value itself but the regulation error. The predicted regulation error is the deviation (difference and sign) of the predicted regulating value from the reference value provided by element 23. The observed regulating error is similarly defined. The observed regulating error is similarly defined. The prediction is established in accordance with the following equation:

$$s = e + k_e \cdot \Delta e + k_x \cdot \Delta x$$

in which:
$s$ is the predicted regulation error,
$e$ is the observed regulation error,
$k_e$ and $k_x$ are constant factors that are applied to the regulation error and the position change of the electrode, respectively
$\Delta e$ is a difference between two successive average values of the regulating value, and
$\Delta x$ is a difference between two successive electrode positions.

This equation is calculated in the addition and subtraction circuit 21. This operation provides a particular output condition in the circuit 21 which is indicated over connection 211 to the final storage register 24. The latter then accordingly provides for actuation of the drive motor 16 in the manner appropriate for reducing the regulation error s to zero.

The above operations will now be further described with reference to the two examples of coarse machining and fine or superfine machining respectively. By the predicted regulation error s calculated by the addition and subtraction circuit 21, the tendency to deformation of form of the individual pulses of FIG. 1a leading to the possible formation of an arc is detected soon enough. If the reference value provided by the reference element 23 to tqe addition and subtraction circuit 21 is greater than the predicted regulation value, which is to say that the predicted regulation error $s$ is negative, the drive motor 16 is actuated with full acceleration, to move the electrodes 1 and 2 apart. The working gap 103 is thereby increased, so that an arc cannot take place. The regulating system of the invention provides protection during the erosion operation, while the electrodes 1 and 2 are regulated for constant width of the gap 103, against the occurrence of an arc by rapid increase of the working gap. The regulating system of the invention also protects against the formation of an arc at the beginning of an erosion operation if the two electrodes 1 and 2 form too narrow a gap 103. If pulses are provided to the gap 103 in that case to the electrodes 1 and 2 which are then motionless, a tendency to arc formation results. The drive motor 16 is then so controlled that the erstwhile motionless electrodes are moved apart with full power. The tendency to arc formation is characterized by the condition in the addition and subtraction circuit 21 in which the reference value provided by element 23 is greater than the predicted regulation value, so that the predicted regulation error s is negative. If now as the result of movement of the electrodes 1 and 2 apart from each other the predicted regulating value is greater than the aforesaid reference value, the regulation error then becoming positive, the final register 24 controls the drive motor 16 in such a way that the two electrodes 1 and 2 are braked with full power. From the foregoing discussion it follows that the regulating system of the invention does not sporadically detect conditions in the working gap 103 but monitors the entire operation, and is thus oriented regarding its course, so that it proceeds with the control of drive motor 16 in terms of the previous history of the operation.

Up to this point the tendency to deterioration or deformation of the working pulse has been described for the case of coarse machining. Deterioration and deformation of the pulse in the case of fine or superfine machining will now be considered. Such a pulse sequence is shown in FIG. 1b.

As already mentioned several times, the tendency frequently arises in this case that the erosion operation suddenly stops and the working gap 103 takes on the property of a low ohm resistance. The form of the pulses shows the tendency where before this event takes place, by means of the regulating system of this invention, this tendency is ascertained in an optimum way by taking account of the previous history of the tendency by means of the predicted regulation error s furnished by the addition and subtraction circuit 21. The pulse 300 of FIG. 2 can now be taken as an example. This pulse is detected in the manner described with respect to FIG. 3 and the results are provided to the regulating circuit 15. There the pulse information is averaged in the manner discussed in connection with FIG. 4 and is operated on in connection with other values so that the addition and subtraction circuit 21 will assume a condition that corresponds to the predicted regulation error s. In the case of the tendency shown in FIG. 1b, a condition results in circuit 21 of FIG. 4 in which the regulating value is smaller than the reference value provided by element 23, so that the predicted regulation error is negative. In this case the electrodes 1 and 2 are pulled apart so that the working gap 103 cannot take on the condition of a low ohm resistance and so that the erosion operation will not be stopped.

As the electrodes 1 and 2 are backed away from each other, as soon as the predicted regulation error formed in circuit 21 of FIG. 4 is greater than the reference regulation error furnished by element 23, the motion of the electrodes apart from each other is at once braked by the drive motor 16. These operations show that the control of the drive motor is always carried out with account being taken of the entire previous history. If, for example, the predicted regulating value in the circuit 21 is greater than the reference value from the element 23, so that the predicted regulation error is positive, and if at the same time the electrodes 1 and 2 are standing still, as for example, before the erosion operation begins, the electrodes will be driven with full power toward each other. On the other hand, if during an erosion operation the electrodes are moving towards each other and if the predicted regulating value is greater than the reference value, so that the regulation error is again positive, the electrodes likewise will be moved towards each other but not necessarily at full power. Similarly, braking of the electrodes moving together is effected if the predicted error is negative.

In principle, the direction of energization of the drive motor 16, for braking or driving as electrode dynamics may require, is determined by whether the predicted regulating value is greater or smaller than the reference value from the element 23 or, in other words, whether the predicted regulation error is positive or negative.

In FIG. 5 the manner of operation of the regulating circuit 15 which consists principally of the averaging circuit 17 and the addition and subtraction circuit 21, is shown in the form of a flow chart. These operations have already been explained and discussed more particularly in connection with FIG. 4. It remains only to be pointed out that the deep end limit value mentioned in FIG. 5 is the limit value that indicates how far the tool electrode may be permitted to penetrate into the workpiece electrode by means of erosion machining. The deep end limit value is set into the system before the beginning of the erosion operation. When this limit is reached, the entire regulation, as well as appropriate parts of the erosion machine, is automatically put out of operation.

Figure 7:
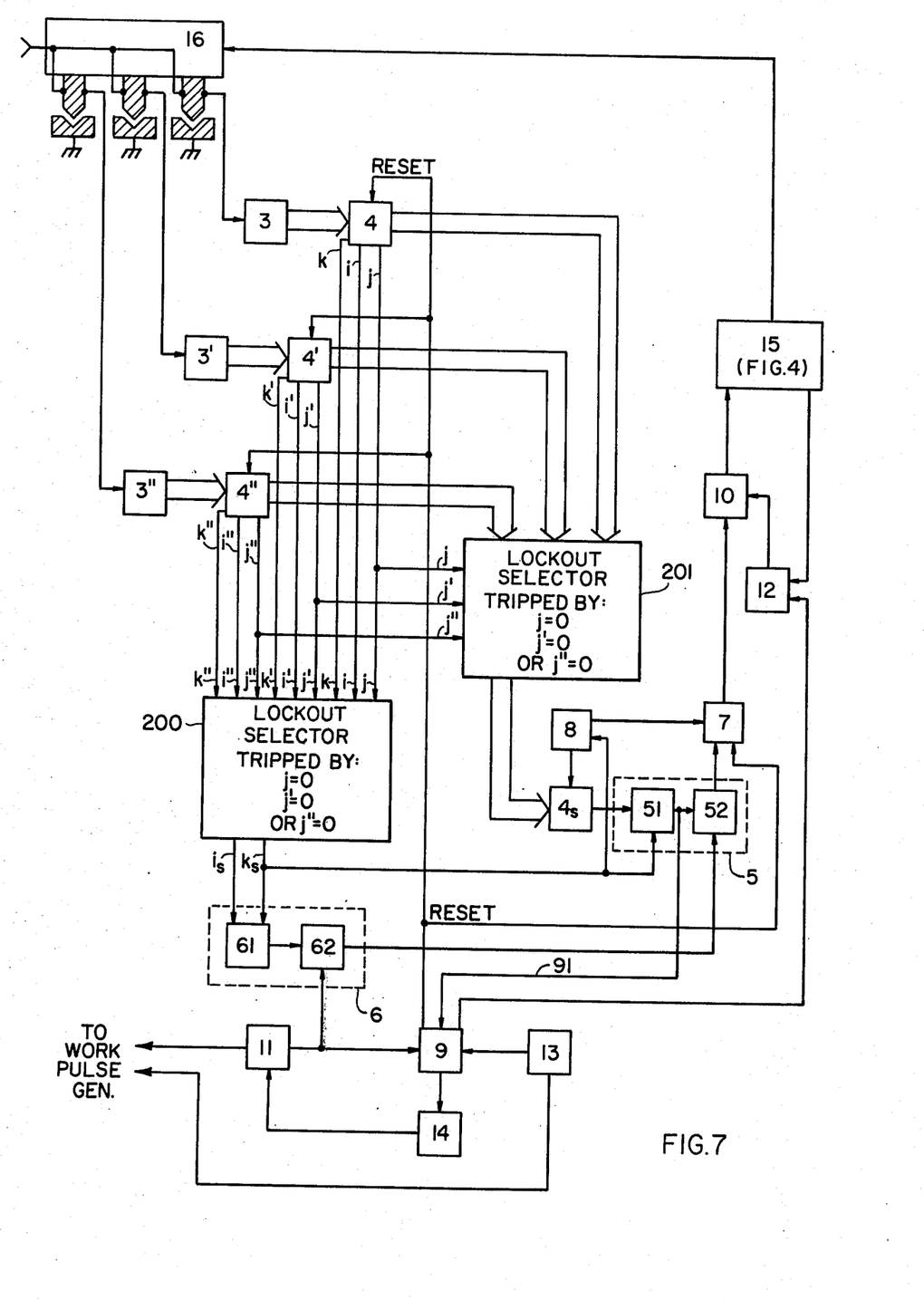
FIG. 7 is a block diagram similar to FIG. 3 for an apparatus according to the invention controlling a machining set up using three component electrodes, each working at a separate gap.

The regulating system of this invention has been described in terms of the regulation of only one electrode pair for reasons of clarity and easier understanding. The regulation system may also be used for drive regulation of a number of electrodes or component electrodes. If an electrode is composed of several component electrodes, each component electrode is connected to a level detector 3, 3' and 3'', respectively, as shown in FIG. 7 for the case of three component electrodes. For each component electrode, the determination of the peak voltage takes place for every pulse as already described. Only for the particular electrode which shows the smallest peak voltage of all component electrodes, which may be by reference to an additional threshold value $j$, higher than $i$, is an additional measurement of the time lapse between the two already described threshold values $i$ and $k$ carried out for each pulse. This component electrode serves as the lead electrode for regulation of all of the component electrodes together. In the system of FIG. 7, utilizing the reference threshold $j$, instead of control changing always to the electrode with the lowest peak voltage, once all electrodes have peak voltages higher the $j$, the control remains where it previously was until the peak voltage of another electrode drops below $j$. The multipole selector circuit that transfers control is shown in two portions 200 and 201 in FIG. 7 for convenience of illustration, the selector 200 selecting the inputs for the logic circuit 61 and the selector 201 selecting the significant input for the coincidence circuit 51, which is shown as fed from an additional storage register 4s for the . . . $m - 1, m, m + 1$ . . . level signals from the selected storage register chosen from among the registers 4, 4' and 4''. In a similar manner, where there are a plurality of electrodes, a single electrode may be used to provide regulation of all of the other electrodes as well as itself. This is a particular advantage in mass production, if identically shaped workpieces are to be machined with electrodes of identical form, for example, in ten or more electro-erosion machines. In this case the drive for all of the electrodes in the mass production group may be controlled from a single regulating system. The particular electrode which shows the lowest peak voltage will provide, as just described, the regulating value for all of the electrodes and thus serve as the lead electrode for the combined drive motor control.

The reference value element 23 may conveniently provide not only a reference value of the regulating value in order to determine the observed regulation error, which is the deviation of the observed average value from the reference value of the regulating value, but also a reference value for the absolute magnitude (i.e. magnitude independent of sign) of the regulation error to determine whether the predicted regulation error $s$ is greater or less than the reference error value.

Then, unless it is greater than such reference error value, as determined by means included in the addition and subtraction circuit 21, the final storage register 24 will be given the same content as if the predicted error were zero, so that the motor is not actuated for small predicted errors unless electrode motion requires braking.

Figure 6:
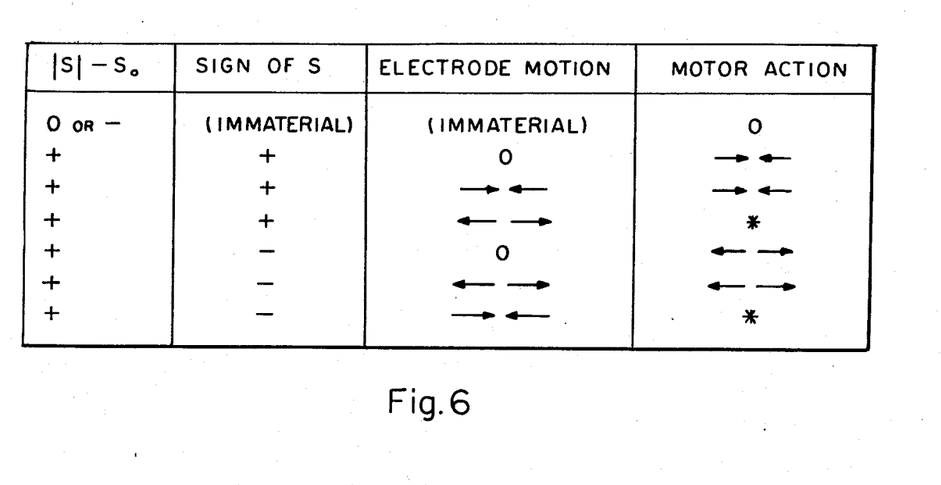
FIG. 6 is a tabulation showing the various combinations of conditions in control logic circuit 24 of FIG. 5 and the corresponding action of drive motor 16.

FIG. 6 is a tabulation summarizing the control applied to the motor 16 for various conditions in the final storage register 24. The symbol $s$ means the absolute value of the predicted error s, regardless of sign and $s_0$ means either a reference threshold value provided by the element 23 or an inherent threshold in the circuit such that unless it is exceeded, s appears to be zero and therefore neither positive nor negative. The final storage register 24 may be a two-place three-valued register (i.e. with a center zero condition capable of registration) or a four-place binary register. In table the direction of electrode motion and of electrode actuation by the motor is indicated by obvious symbols for "together" or "apart". The asterisk symbol indicates braking, which is of course produced by energization urging motion opposite to that being braked.

Although the invention has been described with reference to a particular illustrative example, it will be understood that modifications may be made within the inventive concept without departing from the spirit of the invention.

We claim:

1. Apparatus for regulating the gap between at least one tool electrode and a workpiece electrode in an electro-erosion maching having drive means including a motor (16) for varying said gap, means for applying voltage pulses of predetermined length, repeated at intervals, to said gap for production of electrical discharges and means for passing a working fluid in said gap, which apparatus comprises:
    voltage measuring means for producing a first signal representative of the peak voltage of each of said pulses at said gap;
    time-measuring means for producing with respect to each pulse a second signal representative of the time between the moment said pulse voltage initially exceeds a first predetermined voltage and the time said pulse voltage thereafter drops below a second predetermined voltage;
    means for producing a regulating value signal in response to said first and second signals, said means being constituted so that said regulating value signal being representative of only said first signal whenever the peak voltage of one of said pulses does not exceed said first predetermined voltage, and being representative of a combination of said first and second signals in other cases, and control means for actuating said motor to regulate the width of said gap in dependence upon said regulating value signal, said control means including comparison means in which said regulating value signal is compared with a reference value to determine the deviation, if any, therebetween, and also includes servo control means for actuating said motor so as to reduce said deviation towards zero.

2. Apparatus as defined in claim 1 in which at least one electrode of said electro-erosion machine consists of a plurality of component electrodes and in which said apparatus includes voltage measuring means associated with each component electrode for producing a first set of signals representative of the peak gap voltage for each pulse at each of said component electrodes and also includes selection means to identify a component electrode for which said signal of said first set represents a peak voltage less than a third predetermined voltage value $(j, j', j'')$ and in which, further, said means for producing regulating value is connected by said selection means so as to respond to signals of said first set associated with the component electrode identified by said selection means and to said second signal produced by said time measuring means with reference to the same component electrode to form said regulating value signal and in which apparatus in said control means is caused to operate to to control said motor to move each component electrode in response to said third signal related to said identified component electrode until another component electrode similarly takes over direction of the control function as a result of becoming similarly identified by said selection means on account of reduction of the peak voltage at its associated gap.

3. Apparatus as defined in claim 1 in which said control means includes extrapolation means (20, 201, 22, 221, part of 21) connected to said comparison means (23, part of 21) and responsive to changes of said regulating value and of electrode position over a particular time period for producing a predicted regulating value for a following time period and in which said comparison means constitutes means for determining whether said predicted regulating value for a following time period is greater or less than said reference value, and in which second comparison means are provided to determine whether the absolute difference between said predicted regulating value and said reference value exceeds a second reference value.

4. Regulating apparatus as defined in claim 3 in which:
    said voltage measuring means includes a multiple level detector (3) and a storage register (4), said detector having its input connected to said tool workpiece electrodes (1,2) and having associated means for comparing the relative voltage of said electrodes with a plurality of predetermined threshold voltages ($m$), said multiple level detector (3) being adapted to indicate the surpassing of said predetermined voltages during the initial rise of each of said voltage pulses and to store indications so produced in said storage register (4);
    said time measuring means includes a gate circuit (6), a counter circuit (7), means for supplying timing pulses to said counter circuit during a pulse produced by said gate circuit and means (61) in said gate circuit responsive to said voltage measuring means for causing said gate circuit to produce an output pulse beginning when the initial rise of said voltage pulse at said gap first exceeds said first predetermined voltage ($i$) and terminating when the voltage of said pulse thereafter drops below said second predetermined voltage ($k$), whereby said counter circuit will then hold a measure of the time between the instants at which said voltage pulse possessed said first and second threshold value;
    said regulating value producing means includes an interlock circuit means (5) for connecting said storage register (4) to said counter circuit (7) for transfer of content of said storage register to said counter circuit for addition therein only after said voltage pulse at said gap has just dropped to a value less than said second predetermined voltage;

said control means includes a control logic circuit (9) for transferring, upon completion of the operation of said regulating value producing means, the combined content of said counter circuit (7) as a regulating value signal to said comparator means, and said control means also includes reset means for resetting to zero said storage register (4) and said counter circuit (7) at or shortly after the beginning of the interval between said voltage pulse and the next voltage pulse.

5. Regulating apparatus as defined in claim 4 in which:

said control means includes buffer storage means (10) and also averaging means (17) for repeated averaging of a particular number of regulating value signals, said buffer storage means and averaging means being interposed between said counter circuit (7) and said comparator means (21).

6. Apparatus as defined in claim 5 in which:

said averaging means (17) is provided with a second counting circuit (18) in such a way that with the reception by said averaging means of each regulating value signal the content of said second counting circuit is changed by one while said averaging means (17) adds received regulating values, until said second counting circuit (18) reaches a predetermined content and provides thereupon an output signal for interrupting addition in said averaging means and in which said averaging means is also provided with means for shifting the digits of the sum produced by said addition, when said addition is interrupted, to produce thereby an average value.

7. Apparatus as defined in claim 6 in which said control means includes a difference circuit (20) as part of said extrapolation means and in which the average value of said regulating value produced in said averaging means (17) is provided both to said difference circuit (20) and to said comparison means (21).

8. A regulating apparatus as defined in claim 7 in which:

said difference circuit (20) includes a storage register (201) connected so as to enable said difference circuit to provide a signal representative of the difference between the most recent average regulating value and the next previous average regulating value provided by said averaging circuit (17);

a second difference circuit (22) likewise including a storage register (22) is provided which is connected to electrode position indicating means (26) so as to supply a signal representative of the difference between the electrode position at the time said signal of said first difference circuit is provided and the electrode position related in time to the provision of the aforesaid next previous average regulating value; and in said extrapolation and comparison means the output signals of said first mentioned difference circuit (20) and of said second difference circuit (22), the output signal of said averaging circuit (17) and an output condition furnished by a reference value element (23) are supplied to an addition and subtraction circuit (21) for producing therefrom an output representative of predicted deviation of regulating value from said reference value.

9. Regulating apparatus as defined in claim 8 including in said second comparison means, means for comparing the absolute magnitude of said predicted deviation of regulating value with a predetermined limiting value ($s_o$) and in which there is provided a control logic circuit (24) responsive to the output of said extrapolation and comparison means and including storage register means connected for control, by reference to its content, of the current in the armature of an electrode drive motor (16) according to the following rules:

a. If the absolute value of the predicted deviation of said regulating value predicted by said extrapolation and comparison means (20, 21, 22, 23) is less than a predetermined limiting value, said addition and subtraction circuit (21) sets said storage register of said logic control circuit (24) in a first condition and thereby switches off the current of said motor (16);

b. If the value of said predicted regulating value deviation is greater than said limiting value and is positive, said extrapolation and comparison means (20, 21, 22, 23) sets said storage register of said logic control circuit (24) in a second condition and provides maximum motor current through said armature in the direction appropriate for moving said electrodes (1, 2) together, and c. If the value of said predicted regulation value deviation is greater in absolute magnitude than said limiting value and is negative, said extrapolation and comparison means (20, 21, 22, 23) sets said storage register of said control logic circuit (24) in a third condition and provides a maximum motor current in said armature circuit in the other direction, appropriate for moving said electrodes (1, 2) together.

\* \* \* \* \*